United States Patent Office 3,442,958
Patented May 6, 1969

3,442,958
PURIFICATION OF PHENOL
Chai Y. Choo, Westwood, N.J., assignor to Halcon
International, Inc., a corporation of Delaware
No Drawing. Filed June 23, 1966, Ser. No. 559,734
Int. Cl. C07c 37/22
U.S. Cl. 260—621                                    3 Claims

ABSTRACT OF THE DISCLOSURE

The present invention relates to the purification of phenol prepared by dehydrogenating a crude oxygenated cyclohexane fraction wherein the phenol is contacted with silica alumina.

---

The present invention relates to a process for purifying phenol, and more particularly to a process for purifying phenol obtained by the dehydrogenation of an oxygenated cyclohexane derivative such as cyclohexanol, cyclohexanone, or mixtures thereof.

Phenol is prepared commercially by the dehydrogenation of cyclohexanol or cyclohexanone. A very attractive commercial process involves the oxidation of cyclohexane to yield a crude oxygenated mixture comprising cyclohexanol and cyclohexanone. Dehydrogenation of this crude oxygenated mixture followed by conventional fractionation, however, fails to yield high purity phenol. One reason for this is the presence of an impurity which is very difficult to remove by fractionation.

It is therefore an object of the present invention to provide a process for obtaining high purity phenol from a cyclohexane oxidation process. Another object is to provide a method for removing impurities which are not readily removed during fractionation. A further object is to provide a greater yield of high-purity phenol at lower cost. These and other objects of the present invention will become apparent as the description proceeds.

It has now been found that high purity phenol may be obtained by oxidizing cyclohexane to form a crude oxygenated mixture comprising cyclohexanol and cyclohexanone, dehydrogenating the crude oxygenated mixture to form phenol, subjecting the crude dehydrogenated product to treatment with a material comprising porous silica-alumina, and fractionating. The treatment with silica-alumina removes impurities which are not readily removed during conventional phenol fractionation. One such impurity, identified as "peak B," is present in the crude phenol in quantities of about 100–200 parts per million.

Although the composition of peak B is not known, it is a specific chemical compound which may be identified by its solubility and gas chromatograph retention characteristics. When analyzed under the following conditions peak B appears approximately 1.2 minutes after cyclopentanone and approximately 1.8 minutes prior to cyclohexanone.

GAS CHROMATOGRAPH CONDITIONS FOR ANALYSIS

The analysis is carried out in a F & M Scientific Corporation gas chromatograph, Model 810, having a stainless steel column 10 feet in length with an outside diameter of $\frac{3}{16}$ of an inch. The column is packed with acid-base washed Celite containing 15% by weight of polyethylene glycol having a molecular weight of 20,000. The column has an initial temperature of 60° C. and is heated at a rate of 6° per minute to a temperature of 200° C. The carrier gas is helium flowing at a rate of 50 cc. per minute. The injection temperature is 230° C. and injection volume is 3 microliters. Detection is by flame ionization with a hydrogen flow of 50 cc. per minute.

SOLUBILITY CHARACTERISTICS OF PEAK B

Peak B is not soluble in caustic solution but is soluble in non-polar solvents. It may be separated from phenol by dissolving the phenol in caustic and extracting peak B in a suitable solvent. Peak B may be extracted from the solvent with concentrated sulfuric acid. The specific technique is as follows: a 10 gram sample of phenol containing peak B is added to 120 cc. of 10 wt. percent NaOH. 10 cc. of cyclohexane are added with agitation and the resulting two layers of immiscible liquids are separated. Extracting an aliquot of the cyclohexane solution with 10% sodium hydroxide or propylene glycol or concentrated phosphoric acid fails to remove peak B. On the other hand, extraction of an aliquot with 80% sulfuric acid completely extracts peak B from the cyclohexane solution. The latter conclusions are established by subjecting the respective aliquots to gas chromatograph analysis. The cyclohexane aliquot extracted with concentrated sulfuric acid is free of peak B while the aliquots extracted with NaOH, or propylene glycol or phosphoric acid still contain peak B.

In carrying out the process of the present invention, cyclohexane is treated in liquid phase in a reaction zone with a molecular oxygen-containing gas. The reactor effluent consists of both a liquid and a vapor phase. The vapor phase, containing water and unreacted cyclohexane may be recovered and recycled. The liquid phase contains cyclohexane oxidation products and unreacted cyclohexane. After separating unreacted cyclohexane from the liquid phase, a crude oxygenated cyclohexane fraction remains. This fraction, or a cut thereof, may be dehydrogenated to yield a phenol containing material.

The cyclohexane oxidation usually involves air as oxidizing agent. The air may be diluted with an inert gas such as nitrogen to provide an oxygen concentration of from about 2% to about 15% although molecular oxygen in any concentration or from any suitable source may be employed. The oxidation may be carried out in the presence of a conventional oxidation catalyst. Examples of such catalysts are boron containing compounds such as ortho-boric acid (which is dehydrated to a less hydrated form during the reaction), meta-boric acid, tetra-boric acid, boron oxide, boric acid esters, organic and inorganic salts or oxides of such metals as cerium, cobalt, copper, nickel, manganese, chromium, vanadium, uranium, ferrous salts, antimony, molybdenum, tungsten, tantalum, columbium, zirconium, titanium lead, tin, gold and silver in amounts of a few parts per million, e.g., in the case of cobalt, up to from about 0.1% to about 15%, e.g., in the case of meta-boric acid, by weight of the hydrocarbon. Suitable pressures employed in the oxidation may be from about atmospheric to about 70 atmospheres. Temperatures broadly in the range of from about 100° C. to about 250° C. may be employed although temperatures from about 140° C. to about 180° C. are preferred.

According to the present invention, after dehydrogenation, the phenol-containing material is distilled to remove unreacted cyclohexanol and cyclohexanone and is then treated with a silica-alumina containing material which may contain from about 50% to about 95% silica and from about 5% to about 30% alumina. The silica-alumina should have a surface area of from about 100 to about 325 square meters per gram. Specific examples of such silica-alumina containing materials are Houdry M49, Mobil "Durabead" or Mobil "White Beads." Other similar catalysts normally used in hydrocarbon cracking processes may also be used.

The treatment according to the present invention may be carried out by passing the phenol at a temperature from about 60° C. to about 200° C., preferably from about 100° C. to about 160° C., through a column packed with the silica-alumina containing material at a liquid hourly space velocity of from about 0.25 to about 5 hr.$^{-1}$.

The following examples illustrate the present invention without, however, limiting the same thereto.

EXAMPLE 1

Cyclohexane is subjected to an air oxidation at 150° C. and super-atmospheric presure in the presence of a cobalt naphthenate catalyst so as to give a reaction mixture in which about 10% of the cyclohexane is oxidized. After removal of unreacted cyclohexane, the reaction mixture is vacuum distilled and a cut is obtained as a charge stock for dehydrogenation. This cut contains about 98% of cyclohexanone plus cyclohexanol. Dehydrogenation is accomplished using a 1.5% Pt on silica catalyst to produce crude phenol. After distillation to remove unreacted cyclohexanone and cyclohexanol, the crude phenol is passed at a temperature of 130° C. and a liquid hourly space velocity of 1.0 through a column charged with silica-alumina having the following composition:

| | |
|---|---|
| $Al_2O_3$ | wt. percent 12.4. |
| $SiO_2$ | wt. percent 87.3. |
| Surface area | m.$^2$/g. 290–315. |
| Bulk density | g./cc. 0.62. |
| Pellet density | g./cc. 0.99. |
| Porosity | vol. percent 57. |
| Average pore diameter | Angstroms 82. |
| Absorption | wt. percent 58. |

Essentially all of the peak B compound is removed in this column as indicated by subjecting a sample of the column effluent to gas chromatograph analysis. After passing through the column, the phenol is flashed to remove heavy ends and then fractionated at 250 mm. Hg and a reflux ratio of 10:1 in a 20 plate 2″ Oldershaw column. Other impurities are removed in the forecut and sales specification material is obtained after 14.8% of the phenol is distilled over.

COMPARATIVE EXAMPLE A

The procedure of Example 1 is duplicated using additional quantities of the same starting phenol. In this case the phenol is not subjected to treatment with silica-alumina before being distilled. In this case peak B is not removed and sales specification material is not obtained until after 21% of the phenol is distilled over.

The foregoing examples illustrate that the treatment with silica-alumnia results in an increased yield of 6.2% as well as a concomitant decrease in the amount of material that has to be reworked.

COMPARATIVE EXAMPLE B

The procedure of Example 1 is repeated except that the column is charged with activated carbon. Gas chromatographic analysis of the column effluent indicates that essentially none of the peak B compound is removed.

COMPARATIVE EXAMPLE C

The procedure of Example 1 is repeated except that the column is charged with activated alumina. Gas chromatographic analysis of the column effluent indicates that essentially none of the peak B compound is removed.

The foregoing comparative examples illustrate the unique property of silica-alumina in removing peak B.

The activity of the silica-alumin used to remove peak B according to the present invention declines with time, so that, regeneration is required after an operating period of 200–500 hours. Regeneration is readily accomplished by treating the silica-alumina for from about 2 to about 12 hours, preferably from about 3 to about 5 hours with water having a temperature of from about 50° C. to about 95° C., preferably from about 80° C. to about 95° C. The silica-alumina is treated with water for the foregoing times and at the foregoing temperatures at a liquid hourly space velocity of from about 0.5 to about 2.0. As the length of time required for regeneration is a function of the surface area of the catalyst, there is a distinct advantage in employing silica-alumina having a surface area not substantially above about 325 square meters per gram.

What is claimed is:

1. A process for purifying phenol prepared by dehydrogenating a crude oxygenated cyclohexane fraction comprising contacting the phenol at 60° C. to 200° C. with silica-alumina containing from about 50% to about 95% silica and from about 5% to about 30% alumina, the silica alumina having a surface area of from about 100 to 325 square meters per gram, thereby removing a compound appearing in a gas chromatograph analyzer about 1.2 minutes after cyclopentanone and about 1.8 minutes prior to cyclohexanone, said compound being insoluable in caustic solution, soluble in non-polar solvents, and extractable from said non-polar solvent by concentrated sulfuric acid.

2. A process according to claim 1 wherein said compound is present in a quantity of from about 100 to 200 parts per million.

3. A process according to claim 1 wherein the silica-alumina has a surface area of from about 290 to about 315 square meters per gram.

References Cited

UNITED STATES PATENTS 3,029,294    4/1962    Keeble.

LEON ZITVER, *Primary Examiner.*

H. ROBERTS, *Assistant Examiner.*